United States Patent [19]

Erdman

[11] 4,189,907
[45] Feb. 26, 1980

[54] PICK UP TINE

[76] Inventor: Victor Erdman, 2602-4th Ave. S., Lethbridge, Alberta, Canada

[21] Appl. No.: 906,117

[22] Filed: May 15, 1978

[51] Int. Cl.² .................................................. A01D 77/08
[52] U.S. Cl. ......................................... 56/400; 172/713
[58] Field of Search ........................... 56/400; 172/713

[56] References Cited

U.S. PATENT DOCUMENTS

| | | | |
|---|---|---|---|
| 3,126,693 | 3/1964 | Renn | 56/400 |
| 3,157,019 | 11/1964 | Brackbill | 56/400 |
| 3,323,196 | 6/1967 | Renn | 56/400 |
| 3,401,515 | 9/1968 | Fishbaugh | 56/400 |
| 3,531,927 | 10/1970 | Wood | 56/400 |
| 3,859,777 | 1/1975 | Doering | 56/400 |
| 3,904,026 | 9/1975 | Hofer | 56/400 |
| 3,935,697 | 2/1976 | Hofer | 56/400 |
| 4,029,156 | 6/1977 | Lely | 172/713 |
| 4,077,476 | 3/1978 | Lely | 172/713 |

FOREIGN PATENT DOCUMENTS

| | | | |
|---|---|---|---|
| 1193150 | 4/1959 | France | 56/400 |
| 1114743 | 5/1968 | United Kingdom | 56/400 |

*Primary Examiner*—Louis G. Mancene
*Assistant Examiner*—Paul J. Hirsch
*Attorney, Agent, or Firm*—Stanley G. Ade

[57] ABSTRACT

The individual tine is oval in cross section adjacent the base and gradually changes to a circular cross section at the distal end thereof. It is held in a flexible insert by means of lugs on each side adjacent the base and can be turned so that the wider portion of the oval faces the direction of travel whereupon the tine flexes readily or, the tine can be turned at right angles to the direction of travel thus presenting a much stiffer tine. The first position may be used upon relatively light crops and the second position upon relatively heavy crops.

8 Claims, 6 Drawing Figures

PICK UP TINE

BACKGROUND OF THE INVENTION

This invention relates to new and useful improvements in pick up devices and in particular flexible tines used therewith. Such pick up devices are used on combine harvesters, side delivery rakes, windrowers, hay balers and the like and this application is not limited to any particular pick up device although a side elevation of a portion of a combine harvester is shown schematically in the drawings.

The only prior art known to the applicant includes U.S. Pat. Nos. 3,747,313—3,253,393—3,295,302, 1,326,097—3,613,346—3,126,693 and 3,055,162.

None of these show the present structure although U.S. Pat. No. 3,613,346 discloses a pick up tine which is tapered.

Conventional pick up tines suffer from the principal disadvantage that a certain resiliency has to be built in the tine which will enable the tine to be used under a variety of crop conditions such as a relatively light crop all the way through to a relatively heavy crop. Unfortunately, when a compromise is made, the tine only works effectively under one given condition so that under other conditions either lighter or heavier crop conditions, the efficiency of the tine decreases.

SUMMARY OF THE INVENTION

The present invention overcomes these disadvantages and shows an improvement over existing pick up tines by providing a tine which can be given a relatively flexible characteristic when in one position and a much stiffer characteristic when in another position.

This is accomplished by providing a flexible tine for mounting in a pick up portion of a pick up device, which comprises in combination an elongated tine portion and a base portion on said tine portion, the cross sectional configuration of said tine portion adjacent said base portion having a major axis and a minor axis with the length of the major axis being greater than the length of the minor axis thereby forming a tine having a lesser resistance to bend when said major axis is at right angles to the direction of travel and a greater resistance to bending when said major axis is parallel to the direction of travel.

Another advantage of the present invention is to provide a pick up device for standing grain that has lodged, swathed grain, hay, grass and the like comprising in combination a drum, a plurality of pick up tines extending radially from the surface of said drum, means on the surface of said drum to detachably secure said pick up tines thereto, said means including a retainer, and a resilient insert in said retainer, said pick up tine including an elongated tine portion and a base portion on said tine portion, said elongated tine portion extending through said resilient insert and through said retainer, the cross sectional configuration of said tine portion adjacent the base portion having a major axis and a minor axis with the length of the major axis being greater than the length of the minor axis thereby forming a tine having a lesser resistance to bending when said major axis is at right angles to the direction of travel and a greater resistance to bending when said major axis is parallel to the direction of travel.

Still another advantage of the present invention is to provide a pick up tine which can readily be moved through 90°, manually, when mounted upon the pick up drum and will be retained in this desired position by a resilient mounting provided on the drum.

Another aspect of the invention is to provide a device which is simple in construction, economical in manufacture and otherwise well suited to the purpose for which it is designed.

With the foregoing in view, and other advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

In the drawings like characters of reference indicate corresponding parts in the different figures.

DETAILED DESCRIPTION

Figure 1:
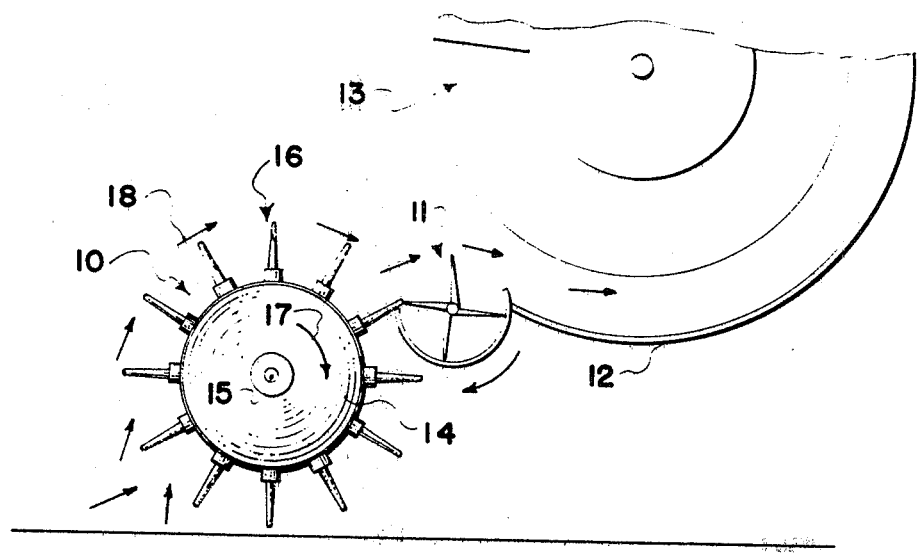
FIG. 1 is a schematic end view of a pick up drum in conjunction with a combine harvester auger assembly.

Proceeding therefore to describe the invention in detail, reference should first be made to FIG. 1 which shows a schematic end view of a drum type pick up collectively designated 10, a stripper assembly collectively designated 11, a combine harvester table 12 and an auger assembly 13 leading to the thresher (not illustrated).

The pick up assembly 10 includes a cylindrical drum 14 mounted upon a shaft 15 and journalled for rotation in a conventional manner (not illustrated).

A plurality of pick up tine components 16 extend radially from the drum which rotates in the direction of arrow 17 thereby picking up material such as grain, grass or the like and moving it in the direction of arrows 18 to the stripper and thence to the auger assembly 13 all of which is conventional.

The surface 19 of the drum is provided with a plurality of retainers 20 preferably made of metal which in turn enclose flexible block type inserts 21 made of synthetic plastic, rubber, or the like.

The individual pick up tines collectively designated 16, are preferably moulded from plastic and include a base disc 22 from which extends the pick up tine portion collectively designated 23. This disc rests upon the surface 19 of the drum and is restrained by the resilient block 21 as clearly shown in FIG. 4. The tine portion 23 extends through an aperture 24 in the upper surface 25 of the retainer 20.

Figures 2, 3, 4, 5, 6:
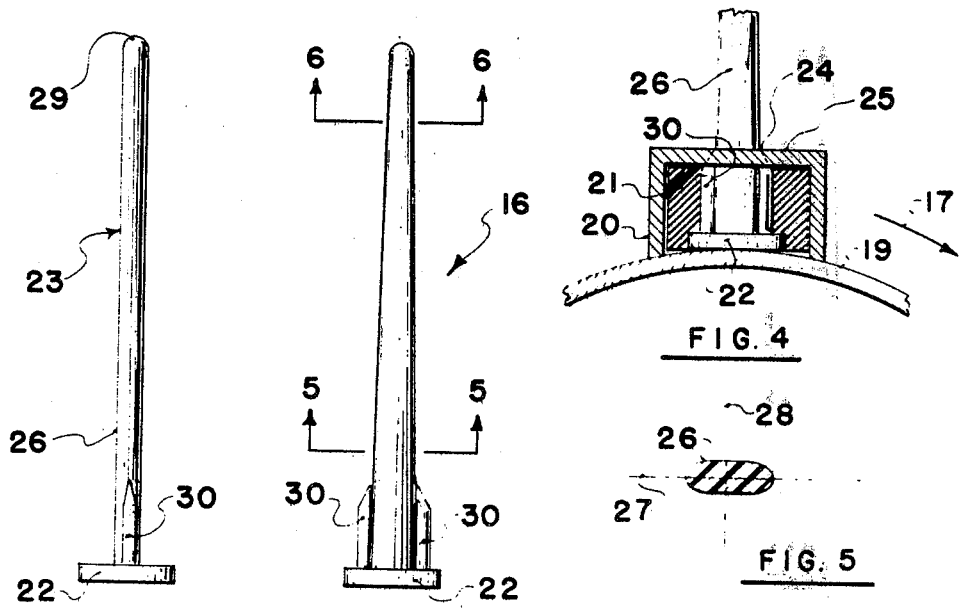
FIG. 2 is a side view of the pick up tine in one position.
FIG. 3 is a view similar to FIG. 2 but showing the tine at right angles thereto.
FIG. 4 is an enlarged fragmentary cross sectional view showing the preferred method of mounting the tine to the pick up drum.
FIG. 5 is an enlarged cross sectional view along the line 5—5 of FIG. 3.
FIG. 6 is an enlarged cross sectional view along the line 6—6 of FIG. 3.

The portion 26 adjacent the base 22, of the tine is provided with a major axis 27 and a minor axis 28 at right angles thereto with the length of the major axis being considerably greater than the length of the minor axis 28 thus presenting a somewhat oval cross sectional configuration as clearly shown in FIG. 5 although of course other cross sectional configurations can be used if desired.

This cross sectional configuration of the portion 26 adjacent the base 22, gradually changes to a circular configuration towards the distal end 29 of the tine as shown in the cross sectional view of FIG. 6.

Due to the resilient characteristics of the plastic material forming the pick up tine assembly, the tine portion 23 is of course flexible. The tine can be positioned relative to the direction of travel 17 in one of two positions. The first position is with the longitudinal axis 27 situated at right angles to the direction of travel 17 under which circumstances the tine portion 23 is relatively flexible as it can bend around the longitudinal axis.

The second position is a position at right angles to the first mentioned position and is as illustrated in FIG. 4 with the longitudinal axis parallel to the direction of travel 17 under which circumstances, the resistance to bending is considerably greater due to the fact that the oval configuration of the portion 26 is aligned so that resistance is encountered.

This means that the tines can be manually manipulated into the first position mentioned under which circumstances the tines are relatively resilient and can be used for example on light crops.

If however heavy crops are encountered, and additional stiffness or rigidity is required, then the tines are aligned in the second position or the position illustrated in FIG. 4.

Means are provided to enable the tines to be rotated through 90° yet to maintain the tines in the desired position once they have been moved thereto.

A pair of ribs 30 are formed integrally with the lower end portion of the tine extending up from the base disc 22 and these ribs are preferably on the longitudinal axis 27 although, if desired, they can be along the minor axis 28.

These engage within the resilient block 21 and although the tine can be rotated manually, nevertheless the engagement of the ribs with the resilient material gives sufficient resistance to prevent inadvertent rotation of the tines during use.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention:

1. A flexible tine for mounting in a pick up portion of a grain harvester pick up, pick up reel for grain harvesters, side delivery rake, windrower, hay baler and the like comprising in combination an elongated tine portion and a base portion on said tine portion, the cross sectional configuration of said tine portion adjacent said base portion having a major axis and a minor axis with the length of the major axis being greater than the length of the minor axis thereby forming a tine having a lesser resistance to bending when said major axis is at right angles to the direction of travel and a greater resistance to bending when said major axis is parallel to the direction of travel, and means adjacent the base portion of said tine to detachably and selectively lock said tine in either desired relationship relative to said pick up portion.

2. The tine according to claim 1 in which cross sectional configuration of said tine portion changes gradually towards a circular cross sectional configuration adjacent the distal end thereof, whereby the distal end portion is flexible to the same extent regardless of the position of the major axis relative to the direction of travel.

3. The tine according to claim 1 in which said means includes a pair of outstanding lugs formed on opposite sides of said base portion and upon the major axis thereof.

4. The tine according to claim 2 in which said means includes a pair of outstanding lugs formed on opposite sides of said base portion and upon the major axis thereof.

5. A pick up device for swathed grain, grass and the like comprising in combination a drum, a plurality of pick up tines extending radially from the surface of said drum, means on the surface of said drum to detachably secure said pick up tines thereto, said means including a retainer, and a resilient insert in said retainer, each said pick up tine including an elongated tine portion and a base portion on said tine portion, said elongated tine portion extending through said resilient insert and through said retainer, the cross sectional configuration of said tine portion adjacent the base portion having a major axis and a minor axis with the length of the major axis being greater than the length of the minor axis thereby forming a tine having a lesser resistance to bending when said major axis is at right angles to the direction of travel and a greater resistance to bending when said major axis is parallel to the direction of travel, each of said pick up tines being movable from a position whereby said major axis is at right angles to the direction of travel, to a position whereby said minor axis is at right angles to the direction of travel and vice versa, and means on said portion of said tine extending through said resilient insert, to detachably retain said tine in either of the said two positions.

6. A pick up device according to claim 5 in which the cross sectional configuration of said tine portion changes gradually towards a circular cross sectional configuration adjacent the distal end thereof, whereby the distal end portion is flexible to the same extent regardless of the position of the major axis relative to the direction of travel.

7. A pick up device according to claim 5 in which said means to detachably retain said tine in either of the said positions includes a pair of outstanding lugs formed on opposite sides of said base portion and upon the major axis thereof.

8. A pick up device according to claim 6 in which said means to detachably retain said tine in either of the said positions includes a pair of outstanding lugs formed on opposite sides of said base portion and upon the major axis thereof.

* * * * *